SAMPLING DIODE GATE AND HOLDING CAPACITOR WITH ANTIDRIFT FEEDBACK MEANS REDUCING DIODE LEAKAGE
Filed May 3, 1961
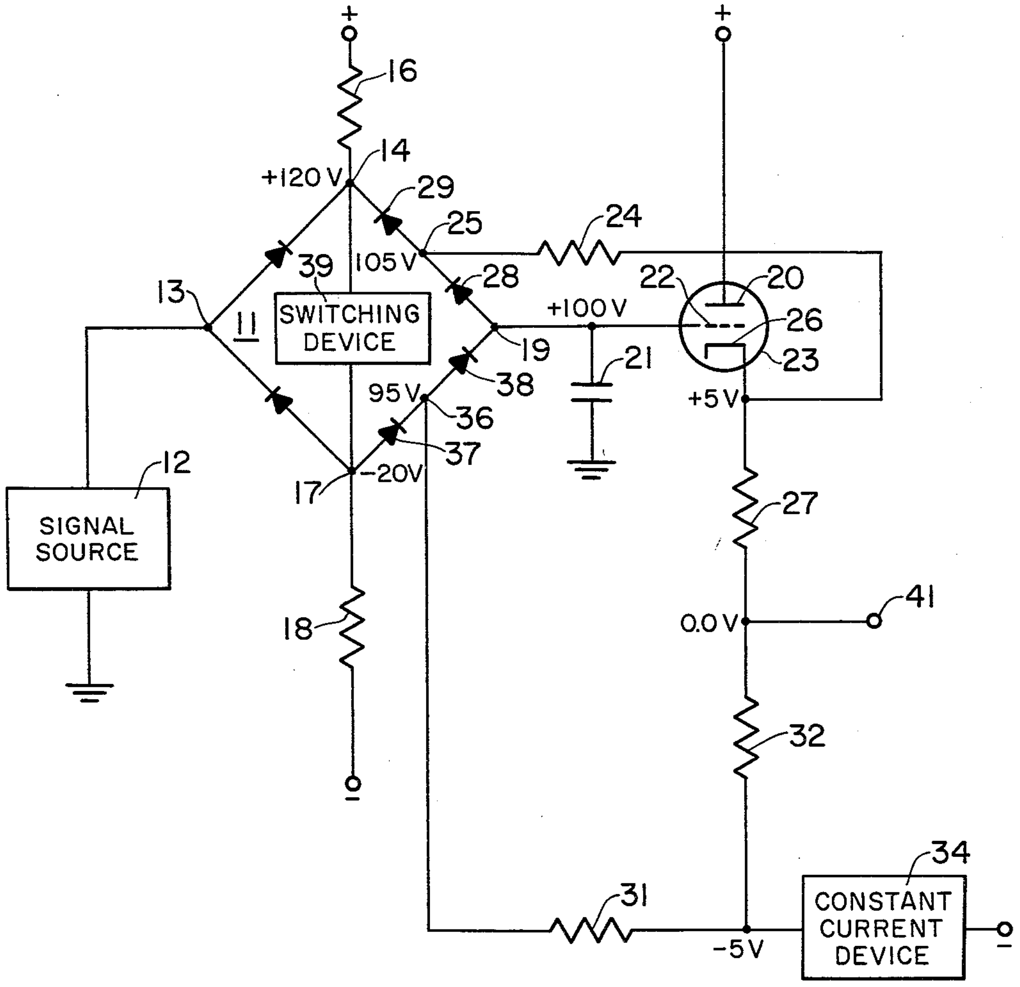
EMORY D. HEBERLING
*INVENTOR.*
BY [signature]
ATTORNEYS United States Patent Office 3,052,851

Patented Sept. 4, 1962

3,052,851

SAMPLING DIODE GATE AND HOLDING CAPACITOR WITH ANTIDRIFT FEEDBACK MEANS REDUCING DIODE LEAKAGE

Emory D. Heberling, Riverside, Calif., assignor to the United States of America as represented by the Secretary of the Navy Filed May 3, 1961, Ser. No. 107,593
5 Claims. (Cl. 328—121)
(Granted under Title 35, U.S. Code (1952), sec. 266)

The invention herein described may be manufactured and used by or for the Government of the United States of America for governmental purposes without the payment of any royalties thereon or therefor.

The present invention relates to a sample and hold circuit and more particularly to a sample and hold circuit wherein means are provided to prevent drifting of the charge stored on the storage capacitor.

Commonly used forms of sample and hold devices consist of a four diode bridge, storage capacitor and cathode follower. If the memory voltage level at the bridge junction connected to the storage capacitor is negative, the D.C. voltage drop across the more positive arm of the bridge will be large compared to the D.C. voltage drop across the more negative arm during the hold period. If the junction is positive the D.C. voltage drops appearing across each arm would be reversed. Leakage across the diode back resistance, because of the large voltage drops, will cause the stored voltage at the junction to drift by varying amounts and in opposite directions depending on the amplitude of the level at the junction.

Accordingly, an object of the present invention is to provide an improved sample and hold circuit with minimum D.C. drift during the holding period.

Another object is to provide a sample and hold circuit with a minimum and balanced diode back bias which automatically remains constant for all memory amplitude levels at drift sensitive switching points of the diode bridge.

A further object of the invention is to provide a sample and hold circuit which does not require careful selection and matching of diode back resistance.

Other objects and many of the attendant advantages of this invention will become readily appreciated as the same becomes better understood by reference to the following detailed description when considered in connection with the accompanying drawings wherein:

There is shown in the single figure a preferred embodiment of the invention.

Referring now to the drawing there is shown a bridge network 11 comprised of two arms having one diode each and two arms having two diodes each. Information source 12, to be sampled, is coupled to input junction 13. A positive bias source not shown is connected to junction 14 through bias resistor 16 and a negative bias source not shown is connected to junction 17 through bias resistor 18. Output junction 19 is connected to storage capacitor 21 and to grid 22 of tube 23 with its anode 20 connected to the positive bias source. A feedback circuit including feedback resistor 24 is connected from the junction of cathode 26 of tube 23 and resistor 27 to junction 25 of diodes 28 and 29. Another feedback circuit including feedback resistor 31 is connected from the junction of resistor 32 and constant current device 34 to junction 36 of diodes 37 and 38. Switching circuit 39 is connected between bias junctions 14 and 17.

In operation only diodes 28 and 38 are involved with drift of the stored D.C. information level at junction 19. The diode cutoff voltages at junctions 25 and 36 are held balanced positive and negative with respect to junction 19 by the minimum voltage necessary to "open" diodes

28 and 38 during the hold period. Resistors 27 and 32 are equal in value and adjusted to provide equal positive and negative voltages with respect to junction 19. Resistors 24 and 31 are high in value (approximately 40 times the value of resistors 27 and 32) as compared to resistors 27 and 32 but are low in value as compared with the back resistance of diodes 28 and 38.

Sampling is accomplished in the well known manner by means of switching device 39 which removes the bias voltage applied to junctions 14 and 17 to permit the signal from signal source 12 to be applied to junction 19.

As the voltage at junction 19 is changed by sampling the input signal, the potential at junctions 25 and 36 are automatically re-adjusted through resistors 24 and 31 respectively to maintain the balanced voltage conditions across diodes 28 and 38 with respect to junction 19.

To maintain a constant voltage drop across resistors 27 and 32 for all signal levels at junction 19 constant current device 34 which may be a single triode tube, for example one-half of a 5670, is provided in the return path of cathode 26. Constant current device 34 also maintains a small and constant current flowing in tube 23 which may be for example one-half of a 5670 over the entire input signal voltage range, thereby minimizing grid or base (where a transistor is used in place of tube 23) current variations applied to holding capacitor 21. Output terminal 41 is provided for coupling the output of the sampling device, preferably, into a high impedance load such as a cathode follower or equivalent solid state device.

In the drawing, illustrative values have been given for the critical junctions involved. As shown there will always only be a 5 volt balanced drop across each of diodes 28 and 38 regardless of the level of potential at junction 19.

Obviously many modifications and variations of the present invention are possible in the light of the above teachings. It is therefore to be understood that within the scope of the appended claims the invention may be practiced otherwise than as specifically described.

What is claimed is:

1. In a sample and hold device of the diode bridge and storage capacitor type for use in a computer; said diode bridge having first and second arms each consisting of a single diode, third and fourth arms each consisting of two diodes connected in series, circuit means coupled to the output of said bridge network and to said storage capacitor for developing first and second voltages that are equal in magnitude and of opposite polarity with respect to the junction of said third and fourth arms and of opposite polarity, first feedback circuit means for coupling said first voltage to a terminal intermediate the series connected diodes of said third arm of said bridge circuit, and second feedback circuit means for coupling said second voltage to a terminal intermediate the connected diodes of said fourth arm of said bridge circuit.

2. In a sample and hold device the combination comprising; a diode bridge having first and second arms each consisting of a single diode, third and fourth arms each consisting of two diodes connected in series, a storage capacitor coupled to an output terminal formed by the junction of the third and fourth arms of said bridge circuit, circuit means coupled to said output terminal for developing first and second voltages that are equal in magnitude and of opposite polarity with respect to said output terminal, and feedback circuit means coupling said first and second voltages in series across the diodes in the third and fourth arms connected to said output terminal.

3. In a sample and hold device the combination comprising; a diode bridge having first and second arms each consisting of a single diode, third and fourth arms each consisting of two diodes connected in series, an input terminal coupled to the junction of said first and second arms and adapted to receive a signal voltage to be sampled, an output terminal coupled to the junction of said third and fourth arms, a storage capacitor connected to said output terminal for receiving a voltage signal from said signal source when said bridge is switched closed, circuit means coupled to said capacitor and to said bridge circuit for preventing the voltage on said capacitor from drifting when said bridge is switched open.

4. The system of claim 3 wherein said circuit means comprises a vacuum triode tube connected in series with a first and second resistor of equal resistance and a constant current device, the grid of said triode being connected to the output of said bridge circuit, the junction of the cathode of said triode and said first resistors being conneced to a terminal intermediate said series connected diodes of the third arm of said bridge circuit, and the junction of said second resistor and said constant current device being connected to a terminal intermediate said series connected diodes of the fourth arm of said bridge.

5. In a sample and hold device the combination comprising; a diode bridge having first and second arms each consisting of a single diode, third and fourth arms each consisting of two diodes connected in series, an input terminal coupled to the junction of said first and second arms and adapted to receive a signal voltage to be sampled, an output terminal coupled to the junction of said third and fourth arm, a storage capacitor connected to said output terminal for receiving a voltage signal from said signal source when said bridge is switched closed, circuit means coupled to the output of said bridge network and to the diodes connected to said output terminal for maintaining a balanced minimum voltage thereacross and thereby prevent drifting of the voltage at said output terminal.

No references cited.